PNEUMATIC TUBING MEMORY

Filed Nov. 17, 1964

INVENTOR
ARNOLD SCHONFELD

BY [signature]
AGENT

Sept. 6, 1966 A. SCHONFELD 3,270,961

PNEUMATIC TUBING MEMORY

Filed Nov. 17, 1964 2 Sheets-Sheet 2

United States Patent Office 3,270,961
Patented Sept. 6, 1966

3,270,961
PNEUMATIC TUBING MEMORY

Arnold Schonfeld, Levittown, Pa., assignor to Sperry Rand Corporation, New York, N.Y., a corporation of Delaware Filed Nov. 17, 1964, Ser. No. 411,846
7 Claims. (Cl. 235—201)

The invention hereinafter described and claimed has to do with memory devices and more particularly to a fluid memory and read-out device.

The rapid advancement in the pure fluid amplifier art which has taken place recently has resulted in the development of pure fluid counterparts for nearly every known electronic element used in logic or controlled circuitry. For example, the pure fluid amplifier art now includes amplifiers, inverters, OR gates, NOR gates and AND circuits. In addition, fluid circuitry has been designed, built and successfully operated employing over one hundred of these fluid elements. Not only is this type of circuitry much easier, simpler and more economical to construct as compared to the equivalent electronic circuitry, but it also promises to be more reliable in operation. Furthermore, fluid circuitry can be successfully operated over widely varying environmental conditions. Due to these obvious advantages of circuitry employing fluid elements over that employing electronic elements, more complex fluid circuitry for performing logic and control functions is now being built or planned.

However, a major obstacle in the way of the development of larger and more complex logic circuitry employing fluid elements has been the speed and size of available fluid memory elements, the great bulk of which have been in the form of fluid flip-flops. The disadvantages of these known flip-flops which deter their use in fluid memories lie in their relatively large size, their relatively high cost and high power requirements. Furthermore, they are volatile in that power must continually be applied to preserve the content of their memories.

Another fluid memory in present use is the fluid delay line memory wherein fluid pulses are introduced into one end of a coiled tubing and emerge at the far end. These pulses are then amplified, re-shaped, re-timed and re-introduced to the front of the delay line. One disadvantage of this type of fluid memory is its long latency time of operation.

The major disadvantage of the two memory devices discussed above is their low storage capacity in relation to the size of the memory device. In other words, the ratio of a bit storage capacity to size of the total memory device is extremely low. Therefore, the use of either the fluid flip-flop memory or the delay line memory is impractical in systems requiring more than a few words of storage. Thus, it is apparent that a memory device employing a concept that would provide for low cost, low power consumption and high memory density is required if fluid circuitry of a complexity comparable to memory requiring electronic logic circuitry is to be achieved.

The present invention has as its primary object to provide a bi-stable fluid memory in which all of the above pointed out disadvantages are eliminated and which provides a non-volatile, low cost, fluid memory capable of operating at high speeds.

It is another object of the present invention to provide such a fluid memory which is small in size and easy to construct.

A still further object of the invention is to provide a fluid memory element capable of being constructed in matrix assembly, affording large storage capacity relative to its size and which has a high speed of operation in the read-in and read-out operations.

In accordance with the above objects and first briefly described the invention comprises a memory element movable between two stable states, "0" or "1," and responsive to fluid pressure to be locked in either. Fluid responsive means is provided for so moving the memory element selectively, and fluid flow means cooperates with the fluid responsive means to sense the locked-in state of the memory element.

Other objects and attendant advantages of the fluid memory element in accordance with the invention will become apparent from the following description when taken in conjunction with the accompanying drawings, wherein.

Figure 1:
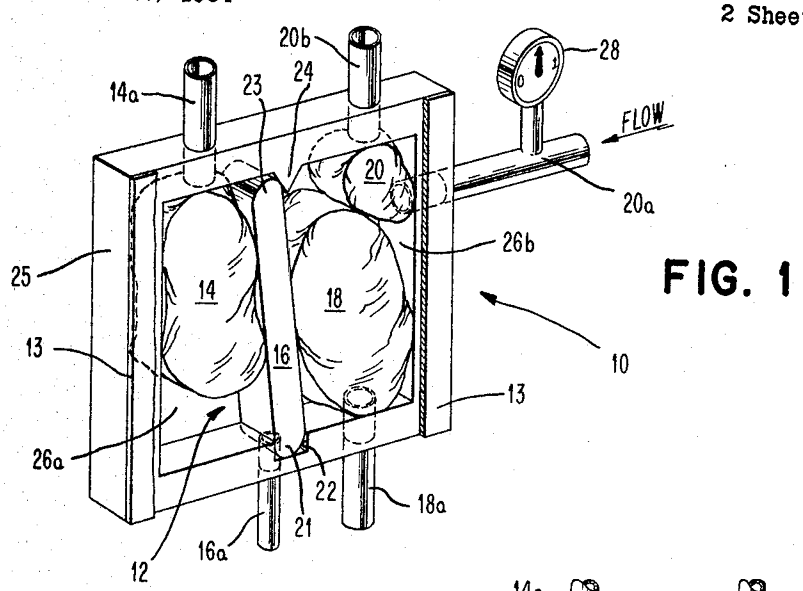
FIGURE 1 is a perspective view of a basic fluid memory unit in accordance with the invention shown in its "0" state and with parts removed to show its internal construction.

Referring now more particularly to the details of FIGURE 1, it is seen that a basic fluid memory unit in accordance with the present invention may comprise a substantially rectangular housing member 10 forming an open front cavity or chamber 12 in which the fluid responsive elements of the unit are housed. Normally the chamber 12 is enclosed by a cover member 13 secured across its front face, as by a suitable adhesive, but broken away here more clearly to show the interior of the housing.

In principle, the unit comprises four balloon like elements 14, 16, 18 and 20 shown here in somewhat tubular shape. It should be understood, however, that this showing is exemplary and that other constructions are contemplated within the scope of the invention. Each of the tubes 14, 16 and 18 is provided with means in the form of narrow tubular fluid conduits 14*a*, 16*a* and 18*a* for connecting them to a convenient source of fluid pressure, not shown, whereby they may quickly be expanded, as described hereinafter. Preferably, these conduit members are flexible to facilitate their threading through the housing openings, as shown. Tube 20 is provided with a fluid inlet conduit 20*a* and a fluid outlet conduit 20*b* of ample diameter to permit fluid normally to flow freely through this tube.

While other materials may be used, tubes 14, 18 and 20 preferably are constructed of relatively thin but tough plastic material, such as polyethylene or vinyl, and tend to be somewhat limp until air is introduced into them. Tube 16 is made of a slightly stiffer material, such as Mylar, to impart some rigidity when empty of fluid pressure, but which becomes quite rigid when fluid pressure is introduced.

Still with reference to FIGURE 1, it is seen that tube 16 is somewhat elongated with its bottom edge 21 seated in a groove 22 in the bottom wall of the housing member 10. Its top edge 23 is positioned on the left side of the V-shape abutment 24 extending into the chamber 12 from the central portion of the underside of top wall 25 of the housing. It will be understood that the position of tube 16 on the left side of abutment represents the "0" state of the memory element, and that its position on the right side of the abutment represents the "1" state. In either position, tube 16 divides the chamber 12 into two areas or compartments 26*a* and 26*b*.

Figure 2:
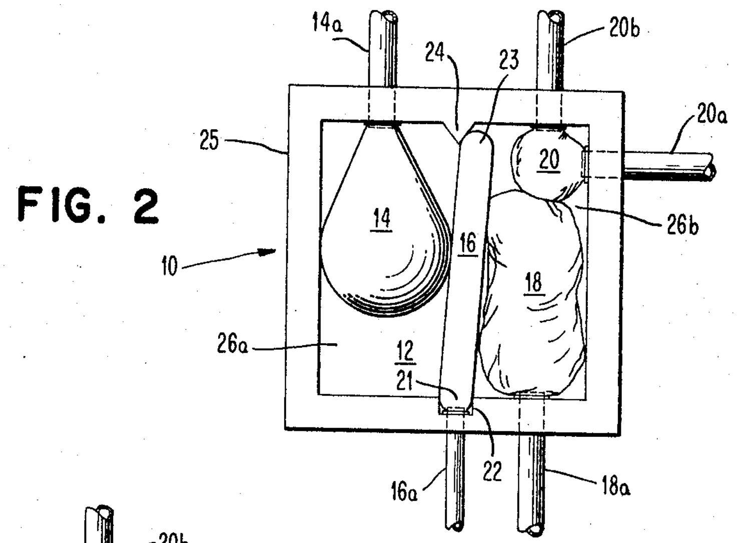
FIGURE 2 is a front elevational view of the basic memory unit shown immediately after being placed in its "1" state.

When it is desired to change the condition of the memory unit from its "0" to its "1" state, fluid under pressure is introduced only into tube 14 through conduit 14*a*. The tube expands to its full diameter in compartment 26*a*, as shown in FIGURE 2, and in so doing causes tube 16 to flex or bend sufficiently to snap over to the right side of the abutment wedge 24 into compartment 26*b*. With tube 16 in this position, there is sufficient space remaining in compartment 26*b* to accommodate tube 18 in its deflated or collapsed condition and tube 20 in its unrestricted condition. All fluid pressure may now be removed without affecting the memory state of the unit. When it is desired to return tube 16 to its "0" state, it is only necessary to admit fluid pressure into tube 18 through conduit 18*a*, while tubes 14 and 16 are deflated. Tube 18 will expand to its full diameter and cause tube 16 to flex and snap over abutment 24 to its left hand side, as shown in FIGURE 1.

Read-out, of course, may be visual by merely looking at the position of tube 16 relative to abutment 24 assuming, of course, that cover 13 is transparent, however, other, more sophisticated, read-out methods are contemplated For example, read-out of either state may be effected by first introducing fluid under pressure to tube 16 through conduit 16*a* and then to tube 18 through conduit 18*a*. If the unit is in its "0" state, tube 16 is locked-in on the left side of abutment 24 leaving sufficient room in compartment 26*b* for full expansion of tube 18 without collapsing tube 20. In other words, readout tube 20 is unrestricted and the free flow of fluid therethrough by way of conduits 20*a* and 20*b* can be sensed, such as by pressure gauge 28 connected to conduit 20*b*, thus to register the "0" state.

Figure 3:
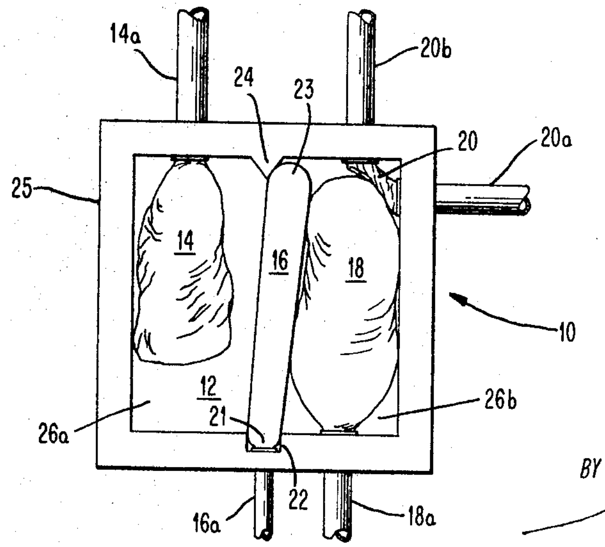
FIGURE 3 is a view similar to FIGURE 2 but showing the memory unit in a "read-out" operation.

If the unit is in its "1" state, as seen in FIGURE 3, with tube 16 locked-in on the right hand side of abutment 24, when tube 18 attempts to expand to its full diameter, it finds its space somewhat restricted by the presence of tube 16 on its side of the abutment, and consequently expands upwardly against tube 20 causing it to be pinched, thus restricting the flow of fluid therethrough. This condition is sensed by the gauge 28 whose indicator needle, because of the increased pressure in conduit 20*a*, now indicates the "1" state of the unit.

It is understood in the above description as well as that below, that the pressure and force relations are correct. For example, on "read-out" when the unit is in its "1" state, the pressure in tube 16 must be such as successfully to resist being moved from this state by the pressure in tube 18.

Conversely the pressure in tube 18 must be such as to overcome the pressure in tube 20 whereby the latter can be pinched by the expansion of tube 18 in compartment 26*b*.

To summarize its operation: the "0" and "1" states of the memory unit are attained by pressurizing either of tubes 18 or 14, respectively. Read-out is effected by first introducing fluid pressure into tube 16 and then into tube 18. If tube 16 is in the "0" state on the left side of abutment 24, tube 18 expands to its full volume without requiring any of the volume occupied by tube 20, which, being unrestricted effects a gauge indication of the "0" state. However, if tube 16 is on the right side of abutment 24, as shown in FIGURE 3, tube 18 expands upwardly to an extent utilizing housing area normally required by tube 20 which will then be restricted or pinched. For a given input pressure on tube 20 a smaller amount of fluid will pass through this tube. The resultant increase of pressure in conduit 20*a* will cause the gauge to indicate the "1" state of the memory unit.

Figure 4:
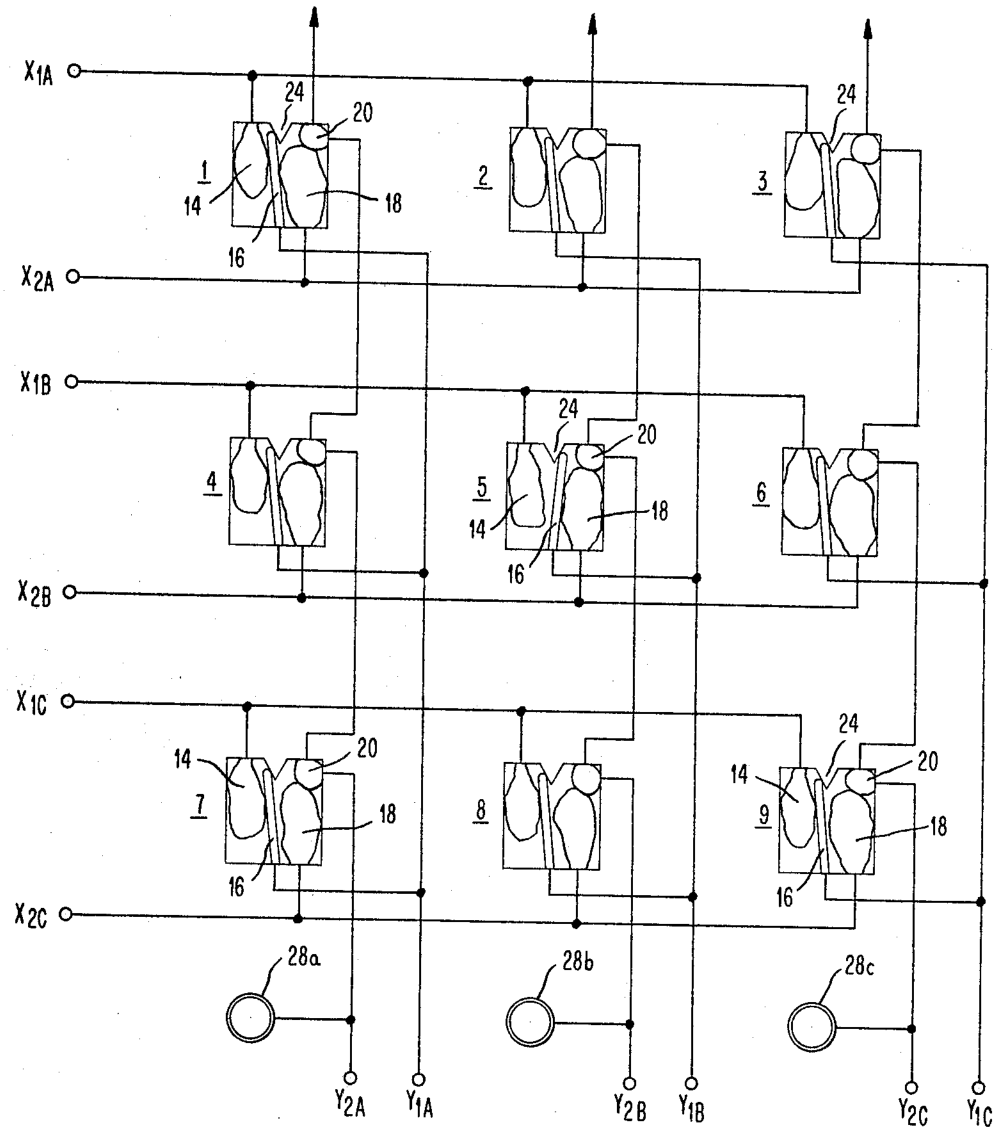
FIGURE 4 is a diagrammatic view showing a plurality of the basic memory units in matrix assembly.

As shown in FIGURE 4, a plurality of these memory units can be assembled in an X–Y matrix select system whereby plural bit words may be stored in accordance with known practice.

By way of example, the matrix has been illustrated, as having three, three bit words formed by memory units 1–9, and with only memory unit 5 in its "1" state. To enter the "bit" in memory unit 5, fluid pressure from a convenient source, not shown, was applied to control lines Y1*a* and Y1*c* locking tubes 16 in the first and third positions of each three bit word in the "0" state. Fluid pressure was then introduced through control line X1*b* expanding tubes 14 in the middle three bit word form by memory units 4, 5 and 6. The rigid locked-in condition of tubes 16 in memory units 4 and 6 prevented them from snapping over to the "1" condition. The unpressurized tube 16 in the center unit 5, however, snapped over the abutment to the right hand side to assume the "1" state. It will be observed that all pressure can be removed from the matrix without destroying the memory.

To read out the information in the matrix, pressure is first applied to control lines Y1*a*, Y1*b* and Y1*c* causing all tubes 16 to be locked in their respective positions, afterwhich fluid pressure is introduced successively into the tubes 18 of each word by way of control lines X2*a*, X2*b* and X2*c*.

All of tubes 16 in the first and third three bit words formed by memory units 1, 2 and 3, and 7, 8 and 9, respectively, are on the left side of abutment 24 permitting all tubes 18 in these words to expand without restricting their tubes 20. Thus, when addressing these two words, the gauges 28 in the Y2 conduits will read "0–0–0." When addressing the word formed by memory units 4, 5 and 6, by way of control line X2*b* there will be no restriction of tubes 20 in memory units 4 and 6. Inflation of tube 18 in unit 5, however, will cause a restriction in its tube 20, and the gauges 28*a*, *b* and *c* will now read "0–1–0," respectively, to indicate the state of these particular units.

Thus, by locking-in all tubes 16 and addressing each word sequentially by entering fluid pressure through control lines X2*a*, X2*b* and X2*c*, and simultaneous reading the gauges conected to lines Y2*a*, Y2*b* and Y2*c*, information stored in the matrix can readily be "read-out." The outlets of all Y2 lines may be connected to suitable utilization devices, not shown, such as fluid amplifiers, or switches, as desired.

It is understood, of course, that the matrix illustrated is by way of example only, and that words of other lengths may as easily be assembled, and that the matrix may be constructed as a unitary entity wherein the chambers and fluid conduits are all formed in a single unitary member as is common in the fluid amplifier art.

The embodiments of the invention in which an exclusive property or privilege is claimed are defined as follows:

1. A fluid memory unit comprising: a housing; a memory element within said housing and movable between two stable states within said housing, and responsive to fluid pressure to be locked in either state; said memory element comprising a flexible semi-rigid element having a fluid inlet conduit whereby fluid pressure may be introduced into the element to effect the locking thereof in either of its stable states; a first fluid responsive means within said housing for moving the memory element from a first state to another; a second fluid responsive means within said housing for returning the memory element to its first state; said first and second fluid responsive means comprising flexible elements positioned on opposite sides of said memory element and each having a conduit for introducing fluid pressure therein to expand the selected fluid responsive means whereby the memory element is moved; and fluid flow means cooperating with one of said fluid responsive means to sense the state of said memory element.

2. A fluid memory unit according to claim 1 wherein: said fluid flow means comprises a flexible fluid conduit passing through said housing in a position to be pinched by the expansion of one of said fluid responsive means when the memory element is locked in one of its states, thus to restrict fluid flow therethrough as an indication of that particular state of the memory element, the other state being indicated by free flow of fluid through the sensing means.

3. A bi-stable fluid memory unit comprising: means forming a chamber; means dividing the chamber into two compartments, said fluid responsive means in one compartment to move said dividing means from one to the other of two stable states wherein the size of said one compartment is enlarged and the other decreased; second fluid responsive means in the said other compartment to return said dividing means to its said one stable state; means for locking said dividing means in either of its stable states; and sensing means cooperating with said second fluid responsive means when said dividing means is locked in either of its stable states to indicate the state.

4. A bi-stable fluid memory unit comprising: means forming an enclosed chamber; first fluid responsive means dividing said chamber into two compartments; second and third fluid responsive means in opposite of said compartments respectively, each capable under fluid pressure to move said first means selectively into one or the other of two positions respectively, wherein the area of one compartment is reduced and the other enlarged; said first fluid responsive means being responsive to internal fluid pressure to be stabilized in either of its two positions; and means to sense the respective position of said first fluid responsive means to indicate the state of said memory unit.

5. A fluid memory unit comprising: means forming an enclosed chamber; abutment means extending partially into said chamber from one wall thereof; a normally semi-rigid hollow first element extending across a mid-portion of said chamber from one side of said abutment to a mid-portion of the opposite wall and dividing said chamber into two side-by-side compartments; first conduit means to introduce fluid under pressure into said first hollow element; a collapsible hollow second element in one of said compartments; second conduit means to introduce fluid under pressure to inflate said second hollow element whereby said first hollow element may be moved to the other side of said abutment when not under fluid pressure; a collapsible hollow third element in the other of said compartments; third conduit means to introduce fluid under pressure to inflate said third hollow element thereby to move said first hollow element back to its said one side of said abutment; a collapsible hollow fourth element also in the other of said compartments; fourth conduit means to permit fluid under pressure to flow freely through said fourth hollow element except when said first hollow element is on the said other side of said abutment under pressure and fluid under pressure is introduced into said third hollow element whereby said third element expands in a direction to collapse said fourth hollow element and restrict the flow of fluid therethrough; and means for utilizing the fluid flow through said fourth hollow element to indicate its condition and thereby one or the other states of said memory unit.

6. A fluid memory unit according to claim 5 wherein: said sensing means comprises a pressure responsive instrument having means for registering the states of said unit.

7. A fluid memory matrix comprising: a plurality of memory units according to claim 4 in rows and columns in matrix select system; and wherein said first fluid responsive means in the memory units in each columns are connected in parallel to a common fluid pressure control line whereby those in each column can be stabilized simultaneously in its respective state; said second and third fluid responsive means in each row of memory units are connected in parallel respectively with common fluid pressure control lines whereby all of said second or all of said third fluid responsive means can be connected to a source of fluid pressure simultaneously; and said sensing means comprises fluid flow means in each of the memory units, those in each column being connected in series flow whereby fluid under a predetermined pressure may either freely flow therethrough, or be restricted by one of said second or third fluid responsive means thereby to indicate the condition of one or all of the units in that column by the pressure difference.

References Cited by the Examiner

UNITED STATES PATENTS

| | | | |
|---|---|---|---|
| 3,057,375 | 10/1962 | Etter | 235—201 X |
| 3,151,623 | 10/1964 | Riordan | 235—201 X |
| 3,168,898 | 2/1965 | Samet | 235—201 X |
| 3,191,858 | 6/1965 | Sowers | 235—201 X |

OTHER REFERENCES

IBM Technical Disclosure Bulletin, D. J. Truslove, vol. 6, No. 11, April 1964, p. 34, Multi-Input Fluid Logical Element.

IBM Technical Disclosure Bulletin, D. J. Truslove, vol. 6, No. 11, April 1964, p. 34, Multi-Input Fluid Logical Element.

RICHARD B. WILKINSON, *Primary Examiner.*

LEO SMILOW, *Examiner.*

TERRY J. ANDERSON, *Assistant Examiner.*